US012773910B2

(12) United States Patent
Costa

(10) Patent No.: US 12,773,910 B2
(45) Date of Patent: Oct. 27, 2026

(54) METHOD AND SYSTEM FOR OPTIMIZING ENERGY MANAGEMENT AND USE QUALITY OF VEHICLES FOR THE MOBILITY OF PEOPLE AND MATERIALS EQUIPPED WITH ELECTRIC OR ELECTRIFIED PROPULSION

(71) Applicant: DG TWIN S.R.L., Naples (IT)

(72) Inventor: Michela Costa, Naples (IT)

(73) Assignee: DG TWIN S.R.L., Naples (IT)

( * ) Notice: Subject to any disclaimer, the term of this patent is extended or adjusted under 35 U.S.C. 154(b) by 121 days.

(21) Appl. No.: 18/845,633

(22) PCT Filed: Mar. 15, 2023

(86) PCT No.: PCT/IB2023/052495

§ 371 (c)(1),
(2) Date: Sep. 10, 2024

(87) PCT Pub. No.: WO2023/175518

PCT Pub. Date: Sep. 21, 2023

(65) Prior Publication Data

US 2025/0196662 A1 Jun. 19, 2025

(30) Foreign Application Priority Data

Mar. 15, 2022 (IT) ........................ 102022000005042

(51) Int. Cl.
*B60L 15/20* (2006.01)
*B60L 50/60* (2019.01)
(Continued)

(52) U.S. Cl.
CPC ........... *B60L 15/2045* (2013.01); *B60L 50/60* (2019.02); *B60L 58/12* (2019.02); *B60L 2240/12* (2013.01);
(Continued)

(58) Field of Classification Search
CPC ...... B60L 15/2045; B60L 50/60; B60L 58/12; B60L 2240/12; B60L 2240/14;
(Continued)

(56) References Cited

U.S. PATENT DOCUMENTS 6,242,873 B1 6/2001 Drozdz et al.
9,211,890 B2 * 12/2015 Miyashita ........... B60L 15/2045
(Continued)

FOREIGN PATENT DOCUMENTS

EP 1 252 036 B1 3/2006
EP 3 068 683 B1 2/2020

OTHER PUBLICATIONS

International Search Report issued Jul. 4, 2023 in PCT/IB2023/052495, filed on Mar. 15, 2023, 3 pages.

*Primary Examiner* — Mary Cheung
(74) *Attorney, Agent, or Firm* — Oblon, McClelland, Maier & Neustadt, L.L.P.

(57) ABSTRACT

A method optimizes the efficiency and quality of use of an electric vehicle. The vehicle includes an electric motor module, a battery module to power the electric motor module, a sensor group, and a control module. The method involves the control module acquiring measurements of the vehicle. The control module also calculates an operating parameter characterizing the use of the vehicle within a predetermined time interval based on the acquired measurements as a function of a power output from the motor; defines a quality of use index based on the operating parameter; determines an optimal value of the power output from the motor for which the quality of use index is equal to or greater than a limit value; and generates a control signal to modify the power output from the electric motor and the transmission ratio from the measured value to the optimal value within the time interval.

12 Claims, 4 Drawing Sheets

(51) Int. Cl.
*B60L 58/12* (2019.01)
*G07C 5/04* (2006.01)

(52) U.S. Cl.
CPC ....... *B60L 2240/14* (2013.01); *B60L 2240/26* (2013.01); *B60L 2240/423* (2013.01); *B60L 2240/486* (2013.01); *B60L 2240/62* (2013.01); *B60L 2240/66* (2013.01); *B60L 2240/70* (2013.01); *G07C 5/04* (2013.01)

(58) Field of Classification Search
CPC ........... B60L 2240/26; B60L 2240/423; B60L 2240/486; B60L 2240/62; B60L 2240/66; B60L 2240/70; B60L 15/10; B60L 15/2054; B60L 50/20; B60L 58/20; B60L 2200/12; B60L 2240/461; B60L 2240/463; B60L 2250/18; B60L 2260/46; B62J 45/411; B62J 45/4152; B62J 45/416; B62M 6/45; G07C 5/04
See application file for complete search history.

(56) References Cited

U.S. PATENT DOCUMENTS

| | | | | |
|---|---|---|---|---|
| 2013/0173100 A1* | 7/2013 | Takagi | B60L 3/0061 180/65.265 |
| 2016/0167519 A1* | 6/2016 | Luke | B60L 58/12 701/22 |
| 2020/0070679 A1* | 3/2020 | Wang | B60L 58/21 |

* cited by examiner

METHOD AND SYSTEM FOR OPTIMIZING ENERGY MANAGEMENT AND USE QUALITY OF VEHICLES FOR THE MOBILITY OF PEOPLE AND MATERIALS EQUIPPED WITH ELECTRIC OR ELECTRIFIED PROPULSION

TECHNICAL FIELD

The present invention relates to the field of mobility. In particular, the present invention relates to a method and a related system for optimizing energy management on vehicles for the transportation of people and/or materials equipped with electric or electrified propulsion systems, to reduce consumption and improve their quality of use. Reference is made to the improvement of the vehicle-mission profile interaction.

State of the Art

The diffusion of electric or electrified propulsion systems today embraces various fields, from urban micro-mobility to material handling, including the automotive sector, work machines, and boats. Material handling includes all the fundamental operations connected to the movement of loose, packaged, individual products by means of manually operated or servo-assisted lifting equipment within the limits of a single production, assembly, transformation company (manufacturing activity), or within services. Material handling also includes vehicles for urban delivery. Autonomous driving vehicles are also included among the means of transportation of people and/or materials (e.g., cargo handling systems in manufacturing, warehouses, or services such as last-mile delivery in urban areas).

Electrification of propulsion is the adoption of an electric motor instead of, or in addition to, a thermal engine (in this case, hybridization is also defined) on a vehicle for the movement of people and/or materials. The engine is connected to the drive shaft of the wheel, or it is a wheel motor type. The engine meets the functional transport requirements by providing power following the withdrawal of current from an electric storage system (battery) located on board the vehicle itself. The current withdrawal may also correspond to power delivery necessary for the movement of auxiliaries being mounted on-board. The storage system must be periodically charged either by an external connection to a specific infrastructure or by recovering kinetic energy during braking and/or generating electricity through the thermal engine (if present). The sizing of the electrical components is carried out based on the so-called mission profile (or use) of the vehicle itself, i.e., the type of use in a given context, in compliance with the specific purpose of the mobility mean. The matching between the vehicle and its mission profile is of interest for functional, economic, and, above all, safety reasons for manufacturers, users, and fleet managers.

In the field of mobility of people, the quality of use of an electric or electrified vehicle, for example, a pedal-assisted bicycle, an e-bike, an electric scooter, an electric car, a truck, etc., affects its acceptability by potential buyers and end-users. In material handling, human interaction with the handling system is important for the specific design of the technologies to be adopted, to adapt work to people, through research and development of solutions and systems capable of supporting and extending operators' capabilities. Quality of use, in this case, is understood as ergonomics in work. In all cases, quality of use and safety of use are linked one to each other.

In electric or electrified vehicles, quality of use can be said to be intrinsically linked to the need to minimize negative externalities deriving from malfunctions, interruption of usability, perception of dangers, and, in particular, from the so-called "range anxiety"—that is, a negative impact on the driving style that is experienced when the battery charge level is equal to or lower than a limit value and a low exercise autonomy is perceived. In this sense, high quality of use is the ability to ensure users driving experiences comparable or improved with respect to those offered by vehicles with traditional propulsion systems, including a correct management of charging and range anxiety issues.

In the field of mobility, it is important for end-users to have access to vehicles and equipment that can provide an optimal and customizable user experience without increasing the cost of purchase and/or maintenance compared to mass-produced products. The optimal user experience can be defined as the best possible match between the user's driving style, the performance characteristics of the vehicle or equipment, and the usage environment.

Electric vehicles mount various types of transmissions, including automatic transmissions, to transmit the torque from the motor to the wheels. While automatic transmissions allow for gradual speed variations of the vehicle, they are not free form problems. For example, the operation of the widely used Continuously Variable Transmission (CVT) may cause noise, which can compromise the driving experience of the vehicle operator and/or the travel experience of one or more passengers.

Furthermore, driving style (and indeed the transmission settings) has considerable impact on energy consumption. Specifically, when the quality of the user experience is reduced, the driving corrections made by the user tend to negatively impact the amount of electric energy drawn from the onboard storage systems (batteries) of the vehicle in a vicious cycle that further compromises the quality of use, energy consumption, and the lifespan of the electro-mechanical components subject to wear and tear-batteries, electric motor, electromechanical actuators, brakes, shock absorbers, gears, bearings, etc.

Similarly, in the case of goods handling vehicles, such as forklift trucks and handling carts, the driving style affects vehicle consumption and the safety of the goods and personnel in the vicinity of the maneuvering vehicle, particularly when a substantial load is carried by the vehicle. Moreover, the propulsion system can deliver powers that are disproportionate to the carried load, resulting in energy losses, particularly when vehicles are operated with partial or empty loads. Material handling does not add value to products or services but increases their final costs.

In all the cases mentioned above, including those with autonomous driving, the actuation of an electric motor, if of on/off type, due to its characteristic torque, determines a sudden draw of current from the onboard electric storage system, which corresponds to power emissions being often twice the required (or set) level, with consequent sudden accelerations of the vehicle which create conditions of lower safety and/or are perceived as "jerks" by the operator. The safety of the vehicle is compromised, especially if the operator is used to non-electrified traditional propulsion vehicles or even for those who are in proximity to these vehicles, particularly if they are autonomously driven.

OBJECTS AND SUMMARY OF THE INVENTION

The purpose of this invention is to overcome the disadvantages of the known art. In particular, the aim of this invention is to provide a method and a related system capable of automatically "correcting" the commands given by a user to the vehicle engine to optimize the management of the on-board energy flows, thereby determining better quality of use and reducing electrical consumption for a typical mission profile, for example, for the same working time, transported load and/or distance travelled by the vehicle.

In particular, in this description, the term "user" includes both a human user, i.e., a pilot of the considered vehicle, and a hardware, software, and/or firmware system configured to autonomously pilot a vehicle. Another objective of this invention is to provide a method and a related system capable of automatically adjusting the vehicle operation to the usage profile, so to obtain, in addition to a rational use of energy, also a significant reduction of stress on electrical, electromechanical, and mechanical components.

In this description, the expressions "usage profile," "usage pattern," and "mission profile" refer to a set of operating requirements of the vehicle, such as a minimum range, maximum and minimum speed limits, maximum and minimum acceleration limits, etc., on a route characterized by a given length and constant or variable slope values. Another objective of this invention is to provide an integrated power control method and system, i.e., of the on-board energy flows of an electric or electrified vehicle and its transmission, capable of adapting to the context of use or to the typical usage profile of the vehicle. Advantageously, such a method and system are configured to integrate the management of energy withdrawal and/or supply, respectively, from and to the on-board electrical storage system with the management of motion transmission to the wheels of the vehicle through manual, semi-automatic, or automatic transmission systems.

These and other objectives of this invention are achieved through a system incorporating the features of the attached claims, which are an integral part of this description. According to a first aspect, the present invention is directed to a method for optimizing the driving efficiency of an electrified vehicle.

The method according to the present invention is configured to process a measure, a quality index of use, not measurable directly but through a "software sensor", and uses this quality index of use to adjust the vehicle operation. In this description, the expressions "driving efficiency" and "quality index of use" indicate an optimization of the vehicle energy consumption and a minimization of abrupt acceleration variations experienced by people and/or objects transported by the vehicle. However, the quality of use may also include an evaluation of the availability of electric charge or other values of variables of interest, to include indicators of the user's perception of the vehicle or, in the case of a vehicle driven by a human user, relative to its safety.

In general, the vehicle comprises an electric motor module, a battery module configured to power the electric motor module, a sensor group, and a control module. The said software sensor is implemented in the control module and measures the perceived quality of use in the real exercise of the vehicle in the specific context, allowing optimal control adaptation to the latter.

In the embodiments of the present invention, the method involves the control module performing the steps of:

- acquiring, preferably over time—for example periodically or asynchronously
  - a measurement of:
    - an interval of usage time starting from an initial time;
    - a vehicle advancement speed;
    - a variation of the battery module state of charge with respect to an initial value;
    - a value or level of electrical power required by the electric motor—for example, from the user through an interface or from a semi/automatic driving software implemented in the control module;
    - a transmission ratio of the torque generated by the electric motor to at least one vehicle wheel;
    - an inclination angle of the vehicle with respect to a reference direction;
    - a load carried by the vehicle;
  - calculating at least one operating parameter characterizing the vehicle use at least as a function of a power value deliverable by the motor in a predetermined time interval based on the acquired measurements,
  - defining a quality of use index of the vehicle as a function of said at least one operating parameter characterizing the vehicle use,
  - determining an optimal value of the power deliverable by the motor for which the quality of use index assumes a value equal to or greater than a limit value, and
  - generating a control signal to modify the power deliverable by the electric motor from the measured value to the optimal value determined within said predetermined time interval.

In particular, "available power" refers to the maximum power that can be supplied by the electric motor, which can be set through a control interface (for example, a knob, a pedal, a button, a touchscreen, etc.) by a human user or by a software application for autonomous or semi-autonomous vehicle driving. The power output of the motor can be measured by detecting the value of the electric current absorbed by the electric motor and the voltage across its electrical terminals.

The method according to the invention corrects the value of power output by the electric motor with respect to what is set by the user or a semi/autonomous driving system in order to optimize the quality of use of the vehicle and reduce electrical consumption.

Preferably, in the case of vehicles with a controllable transmission ratio directly by means of electronic, electromechanical, or mechanical means, the operating parameter characterizing the use of the vehicle is calculated as a function of a transmission ratio in addition to the power output of the motor within the predetermined time interval.

Furthermore, the method includes calculating an optimal value of the transmission ratio together with the optimal value of the power output of the motor such that the quality of use index assumes a value equal to or greater than the limit value and generating a further control signal such as to modify the transmission ratio from the measured value to the optimal value within said predetermined time interval. The control on the transmission ratio can also be intended as acting on the electric motor angular speed.

The described method allows adapting the operation of the electric motor according to one or more optimization criteria, i.e., to a desired mission profile.

In one embodiment, the method includes imposing a power delivery dynamic as a function of time (for example, in terms of electric current supplied by the electric motor)

according to an appropriate function of the current draw from the battery from the moment of motor activation until the optimal value is reached.

Preferably, the power delivery dynamics as a function of time is selected from a linear function over time, a quadratic function over time or their linear combination, possibly weighted by appropriate coefficients. The coefficient values are adaptable to specific needs, also in relation to the response time of the propulsion system that one wants to set to perceive adequate acceleration, thus regulating the elasticity of the propulsion itself.

The control of the power delivery dynamics allows avoiding a peak power absorption by the motor in a short time—for example, on a time interval of the order of tents of a second-which causes over-currents and under-currents that stress both the battery module and the electric motor.

In other words, the calculation of the optimal value of the electric power output by the motor and, optionally, of the optimal value of the transmission ratio, constitutes a higher-level correction capable of guaranteeing a high quality of use, and the corrective intervention on the power delivery dynamics as a function of time constitutes a lower-level correction, which ensures less stress on the electrical components and therefore an increase in the useful life of the entire propulsion system.

Preferably, the step of calculating at least one operating parameter characterizing the use of the vehicle includes calculating at least one of:

- a variation in the state of charge of the electric storage module within the time interval between an initial instant and the time of measurement acquisition,
- a derivative of the acceleration (at least in the direction of advancement) at the time of measurement acquisition.

In this way, the described method allows minimizing vehicle consumption and, at the same time, dynamically controlling the intensity of acceleration variations to minimize the stresses experienced by people—i.e., the perception of "jerks"—and/or objects located on board of the vehicle. In particular, the method allows effectively regulating the power output from the engine and the transmission of torque to the wheels based on a very limited set of information that is easily acquired and "interpreted" autonomously by the control system.

Thanks to this method, it is possible to increase the comfort and safety of use of an electric or electrified vehicle, particularly in electrified micro-mobility, dynamically compensating for sudden accelerations and inadequate power output. In addition, it is possible to increase the autonomy and safety of electric or electrified vehicles for freight handling.

In one embodiment, the step of determining an optimal value of the power output from the engine and an optimal value of the transmission ratio for which the usage quality factor is equal to or greater than a threshold value includes ensuring a non-zero vehicle speed, constant or greater than a minimum threshold value.

In another possible embodiment, the step of acquiring a measurement includes acquiring a measurement of the user heart rate (HR) for vehicles whose propulsion is based on the involvement of the user's muscular effort (e.g., e-bikes). Furthermore, the step of calculating at least one operating parameter characterizing the use of the vehicle includes calculating a trend of the user's heart rate as a function of the power output from the engine and, optionally, the transmission ratio within a predetermined time interval based on the acquired measurements. Thanks to knowledge of the user's heart rate, it is possible to optimize the operation of the electric motor to limit the physical effort to which the user is subjected, particularly in the case of vehicles such as pedal-assisted bicycles.

In one embodiment, the step of acquiring a measurement includes the use of other sensors capable of enabling the acquisition of measurements relating to environmental conditions (temperature, air pressure, local concentration of pollutants, such as fine dust or nitrogen oxides). In this case, the method involves calculating at least one air quality index (AQI) in the usage area, based on the aforementioned measurements acquired within the predetermined time interval.

Advantageously, the method involves using the air quality index to minimize or reduce the user's effort in areas with high pollution to reduce the absorption of toxins by the user associated with breathing. For example, the maximum heart rate value is proportional to the air quality index, i.e., the maximum heart rate tolerated is reduced as air quality worsens.

In one embodiment, the step of defining a usage quality factor as a function of said at least one vehicle operating parameter includes defining the usage quality factor as a linear combination of two or more vehicle operating parameters.

Preferably, the usability quality index is defined as:

$$EQ = \sum_i (w_i \times o_i^{\alpha}),$$

where $o_i$ is a vehicle operating parameter, $w_i$ is a weight coefficient, and $\alpha$ is a proportionality coefficient between the operating parameter characterizing the vehicle use and the usability quality index. In one embodiment, the usability quality index is normalized and can assume a value between zero and one, or between one and minus one.

The Applicant has found that defining the usability quality as a relationship between vehicle operating parameters allows for obtaining, in a simple manner and with a contained computational load, an index that can be easily used to control the vehicle operation. The measurement of the usability quality index constitutes a software sensor that processes and interprets measurements deriving from real sensors mounted on the vehicle to provide a magnitude that cannot be measured through known sensors in the art.

In one embodiment, the usability quality index or EQ is calculated as follows:

$$EQ = w_{JK} \times JK^{-1} + w_{SOC} \times SOC$$

where JK is the derivative of the vehicle acceleration, $w_{JK}$ is a weight coefficient associated with the maximum derivative of the vehicle acceleration, SOC is the state of charge, and $w_{SOC}$ is a weight coefficient associated with the battery state of charge.

The measurement of EQ can be adapted to the usage context based on appropriate logics: the respective weights of the coefficients can be varied according to the relative importance that is intended to be given to the variables characterizing the vehicle operation.

For example, the weight coefficient associated with the derivative of the vehicle acceleration can be chosen beforehand, or it can be a normalized linear combination of correlation coefficients that define the correlation between the electric motor's power output and the derivative of the vehicle acceleration, and between the transmission ratio and the derivative of the vehicle acceleration. Similarly, the weight coefficient associated with the state of charge can be chosen beforehand, or it can be a normalized linear combination of correlation coefficients that define the correlation between the electric motor's power output and the state of charge, and between the transmission ratio and the state of charge.

In one embodiment, the knowledge of the user's heart rate can be used to optimize the operation of the electric motor to limit the physical exertion on the user, especially in the case of vehicles such as electric pedal-assisted bicycles. In this case, the heart rate measurement is used as a constraint parameter to calculate the optimal value of the power output and preferably the transmission ratio, to limit the user's effort within a desired intensity.

In addition to or instead of the heart rate, the method can measure the torque transmitted by the user to move the vehicle—in the case of an e-bike, the torque transmitted through pedaling—and use this input parameter to evaluate the user's "effort" and impose a constraint on the quality of use index to keep the user's effort within a range of acceptable values.

Studies carried out by the Applicant have determined that the quality of use index thus calculated allows defining, through an artificial intelligence (AI) algorithm and with reduced computational load, the optimal values of the controlled input parameters, namely the power output of the electric motor and preferably the transmission ratio, which allow obtaining the minimum perceived jerk for users or transported goods while minimizing vehicle consumption. This allows achieving highly responsive dynamic control even with limited hardware resources. The artificial intelligence algorithm is a single-objective optimization algorithm in which the quality of use assumes the most appropriate definition, as mentioned, based on the specific usage requirements and is maximized with respect to a suitably chosen reference value.

In one embodiment, the step of calculating at least one vehicle operating parameter involves using a dynamic calculation reconstruction algorithm for the vehicle use on the specific profile. In the preferred embodiments, this algorithm is a machine learning algorithm selected from an artificial neural network and a Proper Orthogonal Decomposition-Radial Basis Function methodology and is designed to calculate said at least one vehicle operating parameter as a function of the power output of the motor and a transmission ratio within a predetermined time interval based on the acquired measurements.

The aforementioned algorithm constitutes a digital twin of the real vehicle and allows for objective evaluations of the vehicle quality of use in its context of use as well as specific performance optimizations. In particular, the algorithm can be used in real-time and allows for the identification of inefficiencies in the electric motor operation and the determination of corresponding appropriate corrections.

Preferably, the ML algorithm is trained by means of at least one input parameter matrix and at least one operating parameter matrix, where said input parameter matrix is constructed from M rows, each of which contains:

- an interval of usage time elapsed from an initial time instant (for example, a time instant in which the control module, the motor module, and/or the power module are activated);
- a vehicle speed;
- a value or level of power deliverable by the electric motor;
- a transmission ratio of the torque generated by the electric motor to the vehicle wheel;
- an inclination angle of the vehicle with respect to a reference direction;
- a load on board the vehicle, detected at successive time instants. Said at least one operating parameter matrix comprises an equal number of M rows consisting of the following operating parameters calculated at the same time instants as the input parameters:
- a variation in the state of charge of the battery module with respect to the initial state of charge (i.e., the difference between the initial value at the time and the value at the time of acquisition of the corresponding input measurements);
- a value of the acceleration derivative of the vehicle at the time of acquisition of the corresponding input measurements.

The Applicant has determined that the ML algorithm model can be reliably and robustly constructed by selecting a useful value of M to cover an adequate number of possible combinations within the respective characteristic ranges of the vehicle operation. The value of M can remain small because the controlled input parameters (the state of charge of the battery module and the power deliverable by the electric motor) generally exhibit limited variability, and because it is sufficient to evaluate the input parameters at the extreme values of their respective ranges of variation and at a finite and small number of intermediate values. In particular, the Applicant has identified and selected the input and output parameters as the most relevant for describing the evolution of the vehicle dynamics starting from the provided input parameters, or for formulating an algorithm that reproduces its dynamics over the entire range of variation of said input parameters.

Once constructed, the ML algorithm can be applied to different combinations of input parameters and can predict their corresponding output values. The prediction of the operating parameters enables the implementation of optimization algorithms for at least one of said operating parameters as a function of at least one of said input parameters. The optimized values correspond to the implementation of a higher-level control logic.

In one embodiment of the present invention, said ML algorithm is replaced by a phenomenological numerical model of the vehicle validated based on said input parameter measurements.

Another aspect according to the present invention relates to an electrified vehicle comprising an electric motor module, a battery module configured to power the electric motor module, a sensor group, and a control module. Advantageously, the control module is configured to implement a software product configured to execute the method according to any of the aforementioned embodiments (edge computing).

Another aspect of the present invention relates to a system comprising an electrified vehicle and a remote processing entity (cloud computing). In particular, the vehicle includes an electric motor module, a battery module configured to power the electric motor module, a sensor group, and a local control entity. The local control entity and the remote processing entity are configured to exchange data between them to perform the method according to any of the embodiments described above.

In one embodiment of the present invention, said control system and said method are applicable in retrofitting to existing vehicles.

Further features and objects of the present invention will become more apparent from the following description.

SHORT DESCRIPTION OF THE DRAWINGS

The invention will be described below with reference to some examples, provided for explanatory and non-limiting purposes, and illustrated in the accompanying drawings. These drawings illustrate different aspects and embodiments of the present invention, and where appropriate, reference numbers illustrating structures, components, materials, and/or similar elements in different figures are indicated by similar reference numbers.

DETAILED DESCRIPTION OF THE INVENTION

Figure 1:
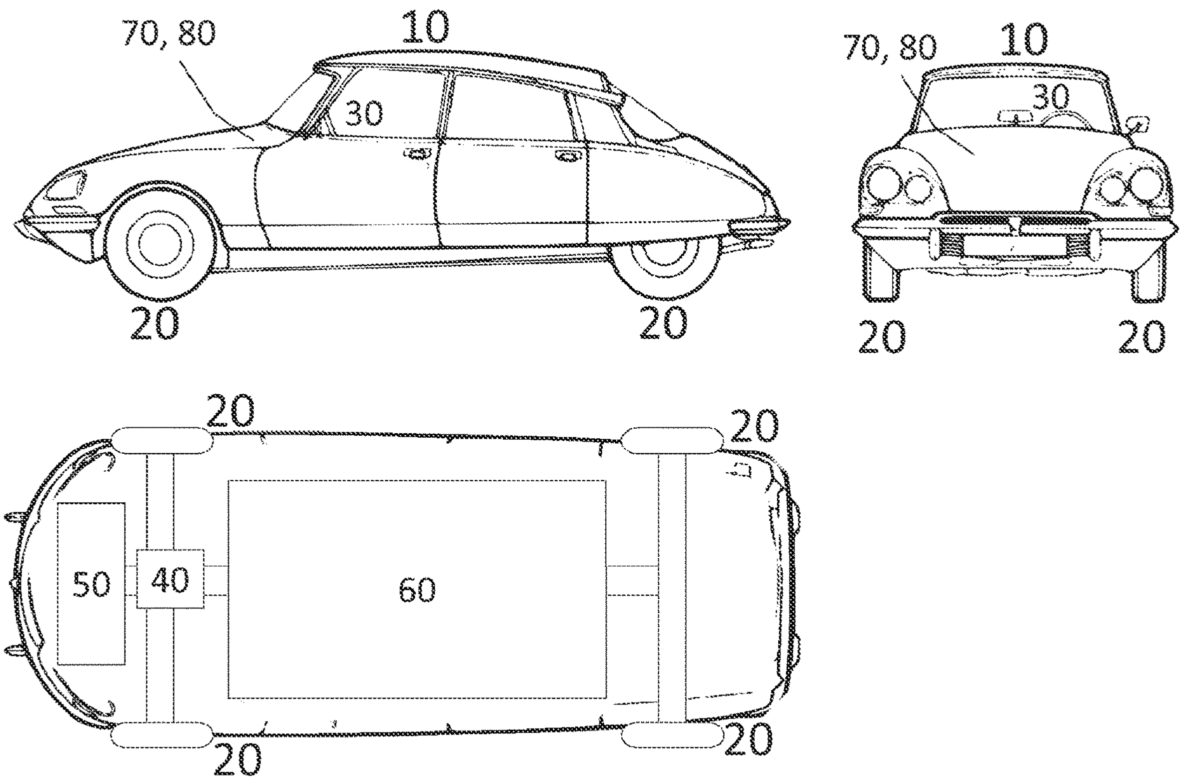
FIG. 1 is a schematic representation of an electrified vehicle.

While the invention is susceptible to various modifications and alternative constructions, some preferred embodiments are shown in the drawings and will be described in detail below. The illustrated vehicle is to be considered as a typical one and that there is no intention to limit the invention to the specific model being illustrated, but, on the contrary, the invention is intended to cover all modifications, alternative constructions, and equivalents falling within the scope of the invention as defined in the claims.

The use of "for example," "etc.," "or" indicates non-exclusive alternatives without limitation unless otherwise indicated. The use of "includes" means "includes, but not limited to" unless otherwise indicated.

Referring to FIG. 1, an electric vehicle 1, in which an embodiment of the invention is implemented, includes a frame 10, four wheels 20, a steering wheel and an acceleration pedal 30, a transmission group 40, a motor module 50, a battery module 60, a sensor group 70, and a control module 80.

In particular, the motor module 50 comprises an electric motor 51 which is mechanically coupled to the rear or back (or both) wheels 20 by means of a transmission system. This can either be manual, automatic or semi-automatic, for example a variator or a differential 52, in order to transmit a driving torque to the wheels.

The electric storage module or battery module 60 includes a battery pack 61, configured to store electric energy, and a battery management system or BMS 62—acronym of Battery Management System—configured to control the delivery and absorption of electric energy by the battery pack 61.

The sensor group 70 (schematically illustrated by a block in FIG. 1) includes a plurality of sensors distributed on the electric vehicle 1 to detect physical parameters associated with the operation of the electric vehicle. A non-limiting example of elements of the sensor group 70 includes a speed sensor—configured to provide a measurement of the speed of the vehicle 1—, a weight sensor—configured to provide a measurement of the load carried by the vehicle 1—and an inclination sensor—configured to provide a measurement of an inclination angle, simply inclination in the following, of the vehicle with respect to a reference direction. For example, the inclination sensor is implemented through an accelerometer or inertial measurement unit (IMU).

The control module 80 includes a processing unit 81—which is equipped, for example, with a microcontroller or microprocessor, a volatile and non-volatile memory—, an input/output interface 82—which includes, for example, a control knob of the motor torque level, a screen, an interface for connection with a mobile phone equipped with a suitable user-vehicle communication application, etc.

The control module 80 is connected to the battery module 60 and, preferably, to the electric motor 50 to control its operation, and to the sensor group 70 to receive the measurements generated by them. The battery module 60 is connected to the electric motor 50, to the control module 80 to provide the electric energy necessary for their operation.

Through the input/output interface 82, the user is able to set the propulsion provided by the motor module 50 to the vehicle, quantifiable in the level of power that can be delivered by the motor module 50 following the current draw from the battery module 60, indicated briefly with "assistance level AS" below. Furthermore, the input/output interface 82 allows to control a transmission ratio M of the driving torque to the wheels—that is, the user can set the "gear" of the motor module 50, also based on an indication received through the interface 82. In the case of an automatic transmission, the transmission system receives an input data directly from the control unit 80.

Figure 2:
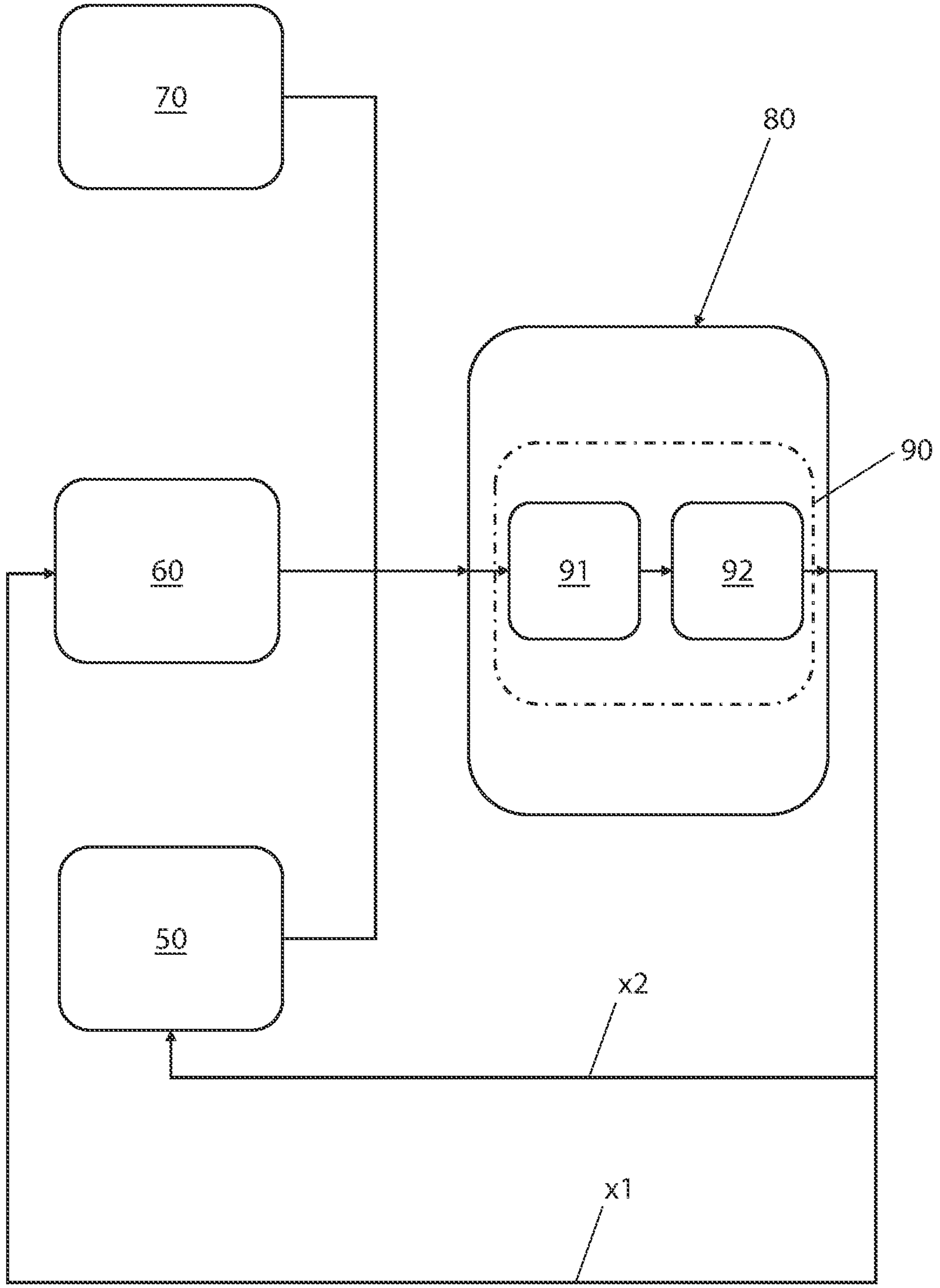
FIG. 2 is a block diagram of a control system according to one embodiment of the present invention.

Referring to the block diagram in FIG. 2, the control module 80 runs a software application 90 configured to process input information from the electric motor 50, battery module 60, and sensor group 70. Based on the processing of the input information and to optimize the user experience, the software application 90 generates a first control signal x1 that regulates the power level supplied by the electric motor and a second control signal x2 that automatically adjusts the transmission ratio.

In a preferred embodiment, the software application 90 is configured to acquire the following input parameters:

- a time interval Δt elapsed from an initial time $t_0$—such as the activation time of the vehicle 1 or the motor module 50—and a time of acquisition t1 of the input parameters, for example, calculated by an internal clock in the control module 80 or an external element included in the sensor group 70;
- a vehicle speed;
- the level of electric motor assistance AS—for example, with discrete values ranging, say, from 0 to 5 corresponding to an assistance command provided by the control module 80 to the motor 51 based on a user selection executed through the input/output interface 82 in case of an electric bike or scooter, or alternatively, with continuous values calculated based on the voltage and current values absorbed by the electric motor in case of electric car, bus, truck;
- the transmission ratio TM—for example, with a discrete value ranging say from 0 to 8 (inclusive) corresponding to a gear command provided by the control module 80 to the variator 52 based on a user selection executed through the input/output interface 82 in case of an electric bike or scooter; this embodiment can be extended to electric cars, buses, trucks when multiple-gear boxes are present;
- a local slope S of the terrain (measured through a slope sensor), and
- a load W on the vehicle (measured through a weight sensor).

Preferably, the input parameters are acquired periodically with an acquisition period ranging from 1 second to tens of minutes, more preferably the acquisition period is in the order of tens of minutes.

In the considered embodiment, the software application 90 includes an artificial intelligence module or AI module 91 configured to receive the input parameters, and calculate at least the following operating parameters that characterize the use of the vehicle:

- a SOC (State of Charge) parameter indicating the variation of stored charge in the battery block 61 between the initial state t0 and the time of acquisition t1 of the input parameters (preferably calculated based on the measurement of voltage and current at the electrical terminals of the battery block 61);
- a JK (Jerk) parameter indicating the variation of acceleration (at least in the forward direction of the vehicle) at a time corresponding to the time of acquisition of the input parameters—the acceleration variation is perceived as a "jerk" by the user.

Continuing the translation: In particular, the tear strength JK and the state of charge SOC parameters are provided as a function of the parameters to be controlled through the control signals x1 and x2, that is:

$$SOC = f(as_x, tm_x), \quad (1)$$

$$JK = g(as_x, tm_x), \quad (2)$$

where $as_x$ is an unknown value of the assistance level AS, and $tm_x$ is an unknown value of the transmission ratio TM.

The operating or output parameters SOC and JK, provided by the AI module 91, are used by an application software management module 92 to calculate the values of the assistance level $as_x$ and the transmission ratio $tm_x$ that allow obtaining a usage quality index EQ higher than a threshold value while guaranteeing a non-zero output speed v, positive in the example of vehicle 1.

In the considered implementation, the quality index EQ is a relation between the operating parameters JK and SOC, such that when the quality index EQ is equal to or greater than a threshold value, preferably assuming or tending to a maximum value, the minimum perceived pulling intensity by the user is obtained, while minimizing the battery block 51 charge consumption.

The management module 92 determines the control signals x1 and x2 that modify the AS and TM level parameters, from the measured values to the calculated values $as_x$ and $tm_x$, respectively, in order to guarantee the optimization of usage quality—in terms of perceived pulling intensity and charge consumption—in order to converge such values.

In other words, the software application 90 detects the commands given by the user (assistance level and transmission ratio) and the travel conditions (state of charge, inclination, and load carried) and regulates the operation of the electric motor to follow the commands given by the user while ensuring the best possible user experience (reducing the perceived pulling intensity and consumption).

In one implementation, the AI module 91 includes a Machine Learning algorithm—abbreviated as ML—of the artificial neural network or ANN type—an acronym for Artificial Neural Network—or a Proper Orthogonal Decomposition-Radial Basis Function or POD-RBF type of ML algorithm.

The ML algorithm is trained through a dataset comprising a set of input parameter matrices and a corresponding set of operating parameter matrices U. Each input parameter matrix P has a size of M×L, where L is the number of input parameters. In the example considered, the input parameters include a time interval Δt elapsed between the initial time $t_0$ and a current acquisition or sampling time $t_1$, the assistance level provided by the electric motor (e.g., determined based on the voltage and current measurements delivered/absorbed by the motor), the transmission ratio (e.g., selected through the input/output interface 82 or set by the control module 80), the vehicle inclination (calculated based on acceleration measurements along at least one horizontal axis—aligned with the forward direction and transverse to the acceleration of gravity—and one vertical axis—aligned with the acceleration of gravity), the measured forward speed, and the measured load on board the vehicle 1. However, the number of rows M is a number of different combinations of input parameter values, for example, M=100. Preferably, the values in each of the M combinations are defined based on a statistical analysis of a plurality of experimental measurements made on at least one real test system or based on an analysis of a simulation model validated based on the vehicle dynamics. Additionally, the input parameter matrix P is constructed such that each row is not a linear combination of the other rows.

Each matrix of operating parameter U has dimensions M×N, where N is the number of operating parameters. In the example in question, AI module 91 is configured to provide the following operating parameters:

- an expected state of charge (SOC) variation of battery pack 61 between the initial time and the input parameter sampling time $t_1$;
- a value of the acceleration derivative of vehicle 1, which is considered an indicative variable of the perceived JK jerk by the user at the input parameter sampling time $t_1$.

The operating parameters for each row of matrix U are calculated at the same input parameter sampling time $t_1$ as the corresponding row of matrix P. For example, if the input parameters for the i-th row of matrix P are acquired at a time $t_i$, the operating parameters for the i-th row of matrix U are referred to the same time $t_i$.

The Requestor has selected L input parameters and N operating parameters in order to define a robust and reliable model of vehicle 1, despite the limited variability of input parameters from software application 90, namely the level of electric motor assistance AS (variable between 0 and 2) and the motor transmission TM (variable between 0 and 8). In particular, the Requestor has determined that it is possible to define a reliable and robust ML algorithm model by selecting an N number of operating parameters greater than just the two operating parameters of interest-JK jerk and SOC in the example considered.

Specifically, the Requestor has identified and selected the most relevant operating parameters for describing the evolution of the vehicle dynamics from the provided input parameters.

The ML algorithm training is performed in a well-known manner, which is not described here for brevity.

In conclusion, once trained, the AI module 91 is able to determine a vector of operating parameters—as a function of the unknown optimal values $as_x$ and $tm_x$, as indicated above—from a vector of input parameters. In particular, in the case of the AI algorithm 91 comprising a POD-RBF based ML, an intermediate matrix K is defined such that:

$$U = K \times P. \quad (3)$$

Figure 3:
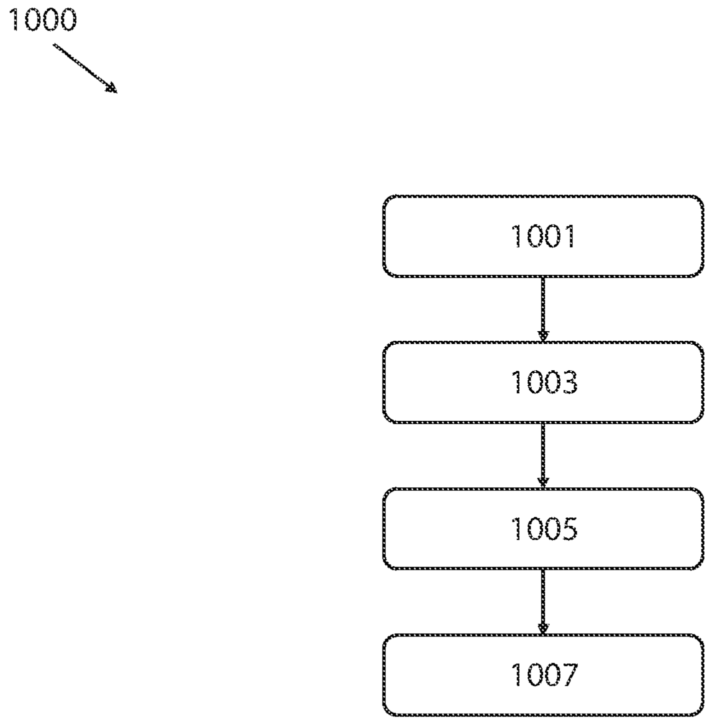
FIG. 3 is a flowchart of a control method according to one embodiment of the present invention.

The control module 80 through the software application 90 performs a control method 1000 described below with reference to the flowchart of FIG. 3.

The control module 80 acquires the input parameters: state of charge SOC of battery pack 51, assistance level AS, transmission ratio TM, slope S, speed v, and load W on board (step 1001). The input parameters can be acquired continuously, periodically, or asynchronously. Preferably, the input parameters are acquired periodically with a period ranging from 1 second to tens of minutes, for example, the input parameter acquisition period is equal to tens of minutes.

The input parameters are processed by the AI module 91, which outputs a vector of operating parameters O (step 1003). The vector of operating parameters O has size N, where N is the number of operating parameters, namely two in the case at hand: SOC variation of battery pack 61 and acceleration derivative JK at the input parameter sampling time $t_i$. It will be clear to the skilled technician that each operating parameter o in the vector of operating parameters O is defined as a function of the optimal values $as_x$ and $tm_x$ that is $o_n(as_x, tm_x)$.

The operating parameters $o_n(as_x, tm_x)$ are used by the management module 92 of software application 90 to calculate the optimal values of $as_x$ and $tm_x$ that maximize the quality of use index EQ, while guaranteeing an advancement speed v at the end of the predetermined time interval that is not null, equal to or greater than a minimum threshold value, or constant—that is, essentially equal to the input parameter advancement speed v (step 1005).

In particular, the quality of use index EQ is defined as a function of one or more of the operating parameters:

$$EQ = f(w_i \times o_i^{\alpha}), \quad (5)$$

where $o_i$ indicates the i-th operating parameter $o_n(as_x, tm_x)$ of the operating parameter vector O, a is a proportionality coefficient that takes on the value +1 or −1 depending on whether the operating parameter of is directly proportional or inversely proportional to the quality of use index EQ, while $w_i$ indicates a corresponding weight coefficient.

In addition, the value of the advancement speed v at the sampling time $t_i$ is used as a constraint to determine the optimal values of $as_x$ and $tm_x$ and can be preset and/or selectable by the user through the input/output interface 82. For example, the optimal assistance level value $as_x$ and transmission ratio $tm_x$ values are calculated in order to maintain the advancement speed v greater than zero.

In the embodiments of the present invention, the weight coefficients $w_i$ are defined empirically or on a statistical basis. In an exemplary embodiment, the weight coefficients $w_i$ are calculated starting from corresponding correlation coefficients $c_{i,n}$. The correlation coefficients $c_{i,n}$ are a measure of the dependence of an operating parameter (i) on an input parameter (n). In one embodiment, a correlation matrix C is defined as the ratio between the covariance matrix between the input matrix P and the output matrix U and the product of the standard deviations of the same matrices P and U. The correlation coefficients $c_{i,n}$ are dimensionless values ranging from −1 to +1. The closer the value of a coefficient $c_{i,n}$ is to zero, the weaker the linear correlation between an input variable and an output variable. Conversely, a positive value is an indication of a positive correlation, where the values of the two variables tend to increase in parallel, while a negative value is an indication of a negative correlation, where the value of one variable tends to increase when the other decreases.

In addition, the statistical significance of the correlations between input and output parameters defined by the correlation coefficients $c_{i,n}$ is also considered. In particular, the statistical significance of each correlation coefficient ci is indicated by the definition of a corresponding probability value or p-value $p_{vi}$. Each p-value $p_{vi}$ is defined between 0 and 1 based on a statistical analysis of several test samples—for example, the input and output parameter values used for the training of the AI module 91. Each p-value $p_{vi,n}$ provides an indication of the statistical validity of the corresponding correlation coefficient $c_{i,n}$—that is, whether there is an actual correlation between a pair of input and output values. In detail, a very small p-value $p_{vi,n}$—for example, less than 0.05 or 5%-indicates a strong correlation between two input and output values.

The weight coefficients $w_i$ are defined based on the correlation coefficient $c_{i,n}$ and the corresponding p-value $p_{vi,n}$. For example, the weight coefficients $w_i$ correspond to a linear combination of the correlation coefficients ci that link the considered operational parameter to the input parameters and have a p-value $p_{vi,n}$ equal to or less than 0.05. Otherwise, the weight coefficients $w_i$ are considered null if the corresponding correlation coefficient has a p-value $p_{vi,n}$ greater than 0.05.

In a preferred embodiment, the quality of use index EQ is calculated as the sum of two or more input parameters oi multiplied by their respective weight coefficients $w_i$:

$$EQ = \sum_i (w_i \times o_i^{\alpha}). \quad (6)$$

In the considered embodiment, the quality of use index EQ is directly proportional to the state of charge SOCF of the battery pack 51 and inversely proportional to the perceived jerk JK during the period. In other words, the quality of use experienced by the user is better (EQ→1) when the perceived jerks and the charge consumption stored in the battery pack 51 are lower.

In other words, the quality of use index EQ is defined by the relationship:

$$EQ = w_{JK} \times JK^{-1} + w_{SOC} \times SOC, \quad (7)$$

where $w_{JK}$ is the weight coefficient associated with the jerk JK, and $w_{SOC}$ is the weight coefficient associated with the variation in the state of charge SOC of the battery pack 51. In this case, the weight coefficient $w_{JK}$ is a normalized linear combination of the correlation coefficients $c_{jk,as}$ and $c_{jk,m}$ that define the correlation between the assistance level and the jerk and between the gear ratio and the jerk, respectively. Similarly, the weight coefficient $w_{SOC}$ is a normalized linear combination of the correlation coefficients $c_{SOC,as}$ and $C_{OC,m}$ that define the correlation between the assistance level and the expected state of charge and between the gear ratio and the expected state of charge, respectively.

The management module 92 of the software application 90 generates control signals $x_1$ and $x_2$, called upper-level signals, so that the assistance level AS and the gear ratio TM pass from the measured values—i.e., set by the user—to the optimal values $as_x$ and $tm_x$ calculated by optimizing the quality of use of the vehicle 1 experienced by the user (block 1007).

In the considered example, the management module 92 of the software application 90 implements a proportional-integral-derivative controller or PID that dynamically regulates control signals $x_1$ and $x_2$ to maintain a value of the quality of use index EQ—which is a function of the optimal values $as_x$ and $tm_x$, i.e., EQ($as_x$, $tm_x$)—equal to a desired value or within a range of values that corresponds to the best possible driving experience for the user. For example, the PID controller is configured to maintain the quality of use index EQ equal to or greater than a desired threshold value.

However, it is clear that the above examples should not be construed in a limiting sense, and the invention thus conceived is susceptible to numerous modifications and variations.

In alternative embodiments (not illustrated), the control unit can be separate from the electric vehicle. For example, the control unit can be implemented in an electronic device-such as a smartphone or similar—in which case the electronic device and the onboard electronics of the electric vehicle comprise retransmission modules configured to exchange data.

In addition or alternatively, the control unit can be of a distributed type. For example, the control module includes a local control entity on board the vehicle and a remote processing entity. The local control entity and the remote processing entity are configured to exchange data between each other in order to execute the method according to the embodiments of the present invention. The remote processing entity, for example, includes computational resources accessible through a communication network—for example, cloud computing and/or edge computing resources.

In this way, it is possible to reduce the computational load on the vehicle onboard electronics required for the operation of the method according to the embodiments of the present invention. Furthermore, the use of the remote processing entity allows for centralized control of a plurality of vehicles, acquiring operating data and allowing for the update of the ML algorithm model and more generally, the entire software product implementing the method according to the embodiments of the present invention in a simple and effective manner.

In a simplified embodiment (not illustrated), the quality of use index is based solely on the perceived jerk by the user or solely on the state of charge of the battery block.

In another simplified embodiment (not illustrated), only the level of assistance provided by the electric motor is controlled, i.e., the only controlled variable is the power absorbed by the electric motor. This embodiment is particularly suitable for the control of simple vehicles without a variable transmission system.

In an alternative embodiment (not illustrated), the sensor group includes sensors configured to acquire information on the user's vital parameters, such as a heart rate sensor. In this case, the software application is configured to calculate the control signals in order to maintain the user's heart rate within a desired range of values, similarly to what was described above in relation to the perceived jerk and battery state of charge.

For example, in an embodiment designed for vehicles whose propulsion is based on the involvement of a user's muscle effort, such as a pedal assisted bike, a measurement of the user's heart rate (or Heart Rate, HR) is acquired as an input parameter.

Similarly, the ML algorithm is trained with a matrix of input parameters comprising a heart rate value—or a maximum heart rate value in the predetermined time interval. The algorithm thus trained is able to calculate, as a performance parameter, the user's heart rate as a function of the assistance level $as_x$ and the transmission ratio $tm_x$. Thanks to the knowledge of the user's heart rate, it is possible to optimize the operation of the electric motor in order to limit the physical effort to which the user is subjected, defining the quality of use index EQ as:

$$EQ = w_{JK} \times JK^{-1} + w_{SOC} \times SOC + w_{HR} \times HR,$$

where HR is the heart rate and WHR is a corresponding weight.

Advantageously, the quality of use coefficient thus calculated can be used to maintain the user's heart rate within a desired range of values.

In an alternative embodiment (not illustrated), the heart rate measurement is used as a constraint parameter along with the speed value to calculate the optimal value of the power that can be delivered and, preferably, of the transmission ratio in order to limit the effort sustained by the user within a desired intensity.

In an alternative embodiment (not illustrated), the sensor group includes sensors—for example, torsion sensors applied in the pedal hub—configured to measure a torque transmitted by the user in order to move the vehicle. In this case, the ML algorithm is configured to measure the torque transmitted by the user to the vehicle. In this case, the measurement of the torque transmitted by the user provides an indication of the user's muscle effort level.

In this case, the measure of the torque transmitted by the user is used as a constraint parameter along with the speed value to calculate the optimal value of the deliverable power and, preferably, the transmission ratio in order to limit the effort sustained by the user within a desired intensity.

Again, there is nothing preventing the use of both heart rate and the torque transmitted by the user to define the constraints on the optimal values to be calculated.

In one embodiment (not illustrated), the step of acquiring a measurement includes the use of other sensors capable of enabling the acquisition of measurements related to environmental conditions (temperature, air pressure, local concentration of pollutants, such as fine dust or nitrogen oxides). In this case, the method involves calculating at least one air quality index or AQI based on the aforementioned measurements acquired within the predetermined time interval.

In this case, the method involves using the air quality index to minimize or reduce the user's effort in areas with high pollution in order to reduce the user's absorption of toxins associated with breathing. For example, the maximum heart rate value is proportional to the air quality index used.

In one embodiment (not illustrated), once the optimal deliverable power has been determined, it is expected to impose a power delivery dynamic as a function of time. In other words, power delivery is regulated according to a suitable function of current drawn from the battery starting from the moment the electric motor is activated and until the optimal value is reached.

Preferably, the power delivery dynamics as a function of time is selected from a linear function over time, a quadratic function over time, or a linear combination of the two, possibly weighted by suitable coefficients. The value of the coefficients is adaptable to specific needs, also in relation to the response time of the propulsion system that one wants to set to perceive adequate acceleration, thus, to regulate the elasticity of the propulsion itself.

Control of the power delivery dynamics allows to avoid a peak of power absorption to the motor in a short time—for example, over a time interval of the order of a second—which causes overcurrents and undercurrents that stress both the battery module and the electric motor.

In other words, the calculation of the optimal value of the electric power delivered by the motor and, optionally, the optimal value of the transmission ratio, constitute a higher-level correction capable of guaranteeing high-quality use. Moreover, the corrective intervention on the power delivery dynamics as a function of time constitutes a lower-level correction, which ensures less stress on the electrical components and therefore an increase in the useful life of the entire propulsion system.

In one embodiment, in which a high memory space is available on the memory module 80 and/or a high data transmission bandwidth to the remote processing entity, the acquisition period is reduced, for example, to 10 seconds.

In one embodiment, the periodicity with which input values are acquired is variable. Preferably, the acquisition frequency is increased when variations in speed, acceleration, and/or inclination greater than respective maximum threshold values are detected. Conversely, the acquisition frequency is reduced when variations in speed, acceleration, and/or inclination lower than respective minimum threshold values are detected.

Figure 4:
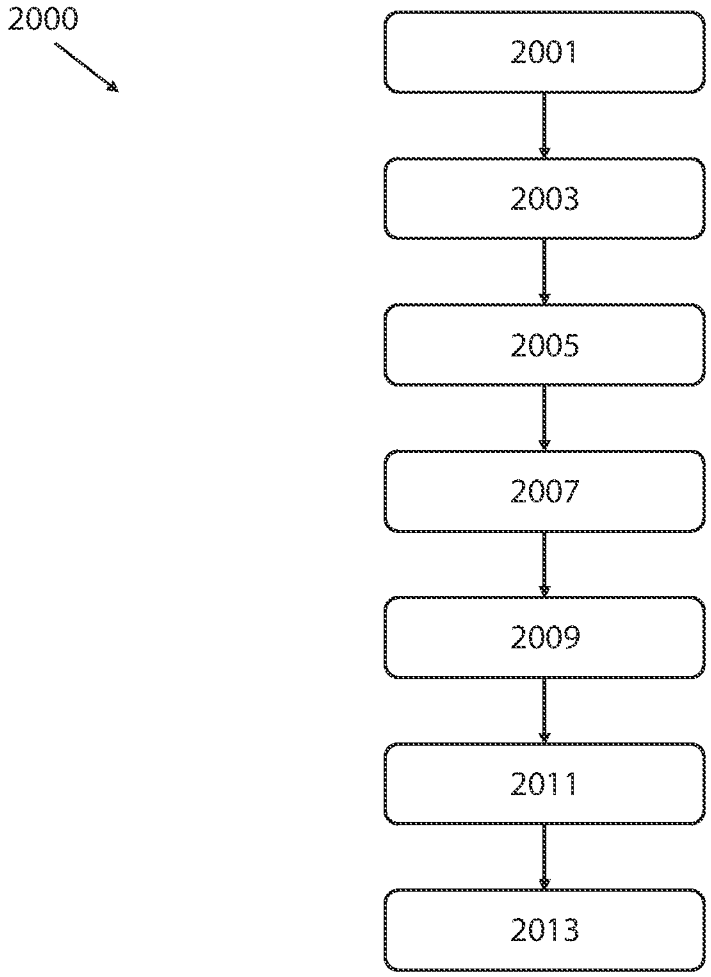
FIG. 4 is a flowchart of a control method according to an alternative embodiment of the present invention.

In a more complex embodiment, the control module 80 is configured to allow the user to select one or more criteria for optimizing the driving experience through the input/output interface 82. In this case, the software application 90 is configured to execute an alternative method 2000—of which FIG. 4 is a flowchart. In particular, it is expected that the user selects one or more optimization criteria (step 2001). For example, one or more of minimizing jerk, minimizing energy consumption, minimizing physical effort, etc.

Once the criterion or combination of criteria is selected, the software application 90 is configured to select a corresponding vehicle-model 1 used by the AI module 92 to determine or operating parameters associated with the selected criteria (step 2003). Advantageously, the software application includes a set of models, each trained to provide the operating parameters necessary to optimize the driving experience based on the selected criterion(s). Next, the software application 90 acquires a set of input parameters associated with the selected optimization criteria (step 2005), and the AI module calculates the operating parameters based on the optimal values of the assist level $as_x$ and transmission ratio $tm_x$ (step 2007), similarly to the steps 1001 and 1003 of the method 1000 described above.

Subsequently, the management module 92 first defines the EQ quality index based on the selected criterion(s) (step 2009), and then determines the optimal $as_x$ and $tm_x$ values that maximize the EQ quality index (step 2011), similarly to step 1005 of method 1000 described above.

Finally, the management module 92 generates control signals $x_1$ and $x_2$ so that the assist level as and the transmission ratio M transition from the measured values to the optimal values $as_x$ and $tm_x$ calculated by optimizing the quality of the user's driving experience (step 2013), similarly to step 1007 of method 1000 described above.

As will be apparent to one skilled in the art, one or more steps of the above-described procedure can be executed in parallel with each other or in a different order than presented above. Similarly, one or more optional steps can be added or removed from one or more of the above-described methods.

In an alternative embodiment (not illustrated), instead of using a PID system, single- or multi-objective maximization algorithms are implemented to optimize the EQ quality index. These algorithms are designed to identify at each instant which combination of assist level (regulated through the first control signal $x_1$) and transmission ratio (regulated through the second control signal $x_2$) allows achieving the desired goal: minimum perceived jerk JK, maximum final charge state SOC (i.e., minimization of energy consumption), or a combination of them.

In more advanced configurations, the selection of the power absorbed by the electric motor and the gear can derive from an appropriate definition of fuzzy logic dependencies between the assist level (in terms of the motor power supply current) and the gear with respect to the parameters measured by real sensors and the parameters defined by the AI module.

In one embodiment (not illustrated), the control module is configured to store operating data, in particular measurements associated with input and output parameters, and periodically retrain the artificial intelligence module to more precisely adapt the optimization of the quality of use to the specific characteristics of the vehicle and/or the user's driving style.

Of course, all details are replaceable by other technically equivalent elements. For example, nothing prevents the implementation of the above-described systems and methods in a different electric or hybrid propulsion vehicle. In conclusion, the materials used, as well as the contingent shapes and dimensions of the devices, apparatuses, and terminals mentioned above, can be any according to specific implementation needs without departing from the scope of the following claims.

The invention claimed is:

1. A method for optimizing a use quality of an electric vehicle, the vehicle comprising an electric motor module, a battery module configured to power the electric motor module, a sensor group, and a control module, the method comprising the steps of:

acquiring a measurement of:
- an interval of vehicle usage time from an initial time;
- a vehicle speed;
- a state of charge of the battery module;
- a value of power output from the electric motor;
- a transmission ratio of torque generated by the electric motor to a wheel of the vehicle;
- an inclination angle of the vehicle with respect to a reference direction; and
- a load present on board the vehicle;

calculating at least one operating parameter characterizing the use of the vehicle at the predetermined usage time based on the acquired measurements as a function of at least one value of power output from the motor;

defining a quality of use index of the vehicle as a function of said at least one operating parameter of the vehicle;

determining an optimal value of the power output value from the motor for which the quality of use index is equal to or greater than a threshold value; and generating a control signal to modify the power output from the electric motor and the transmission ratio from the measured value to the optimal value within said predetermined interval of time, wherein the step of calculating at least one operating parameter provides for:

calculating the at least one operating parameter as a function of the value of power output from the motor and the transmission ratio of the torque generated by the electric motor to a wheel of the vehicle, and further comprises the steps of:

determining an optimal value of the transmission ratio for which the quality of use index is equal to or greater than a threshold value; and generating a further control signal to modify the transmission ratio from the measured value to the optimal value within said predetermined interval of time.

2. The method according to claim 1, wherein the step of calculating at least one operating parameter of the vehicle comprises calculating at least one of:

a change in the state of charge between the initial time and a time of acquisition of measurements; and a value of the derivative of the vehicle acceleration at a time of acquisition of measurements.

3. The method according to claim 2, wherein the step of acquiring a measurement comprises acquiring a measurement of the heart rate of a user of the vehicle or of a torque transmitted by the user to a mechanical propulsion system of the vehicle, and wherein the step of determining an optimal value of the power output value from the motor and an optimal value of the transmission ratio, when calculated, for which the quality of use index is equal to or greater than a threshold value provides for ensuring that the user's heart rate is less than or equal to a maximum threshold value.

4. The method according to claim 3, wherein the step of acquiring a measurement comprises acquiring data indicative of an air quality in an area crossed by the vehicle, calculating an air quality index on the basis of the acquired data, in which said threshold value is proportional to the calculated air quality index.

5. The method according to claim 1, further comprising a step of imposing a power delivery dynamic based on time according to a selected one of:

a linear function of time, a quadratic function of time, and a linear combination of the two.

6. The method according to claim 5, wherein the linear combination is weighted by appropriate weight coefficients.

7. The method according to claim 1, wherein the use quality index is defined as $$EQ = \sum_i (w_i \times o_i^{\alpha}),$$

where $o_i$ is a vehicle operating parameter, $w_i$ is a weight coefficient, α is a proportionality coefficient between the vehicle operating parameter and the use quality index.

8. The method according to claim 7, wherein the step of calculating at least one vehicle operating parameter comprises calculating:

a change in state of charge between the initial time and the time of acquisition of the measurements, and a value of the derivative of the vehicle acceleration at a time of acquisition of the measurements, and wherein the use quality index is calculated as:

$$EQ = w_{JK} \times JK^{-1} + w_{SOCF} \times SOC$$

where JK is the derivative of the vehicle acceleration, $w_{JK}$ is a weight coefficient associated with the derivative of the vehicle acceleration, SOC is the change in state of charge, and $w_{SOC}$ is a weight coefficient associated with the change in state of charge.

9. The method according to claim 1, wherein the step of calculating at least one vehicle operating parameter involves using a Machine Learning algorithm selected from an artificial neural network and a Proper Orthogonal Decomposition-Radial Basis Function methodology to reconstruct, within a predetermined time interval based on the acquired measurements, the dynamics of the vehicle in its usage context during an observation period and calculate said at least one vehicle operating parameter characterizing the use of the vehicle as a function of an engine power output and a transmission ratio.

10. The method according to claim 9, wherein the Machine Learning algorithm is trained by at least one matrix of input parameters and at least one matrix of operating parameters, wherein said matrix of input parameters comprises a plurality of rows, each row comprising the following input parameters:

a usage time interval starting from an initial time instant;

a vehicle advancing speed;

a value of power outputtable by the electric motor;

a transmission ratio of torque generated by the electric motor to the vehicle wheel;

an inclination angle of the vehicle with respect to a reference direction, and a load on board the vehicle, and said at least one matrix of operating parameters comprises a plurality of nonlinear combinations of the following operating parameters:

a change in state of charge between the initial time instant and the time of acquisition of the measurements; and a value of the derivative of the vehicle acceleration at the time of acquisition of the measurements.

11. An electric vehicle comprising:

an electric motor module, a battery module configured to power the electric motor module, a sensor group, and a control module, wherein the control module is configured to implement a software product configured to execute a method for optimizing a use quality of the electric vehicle, the method comprising the steps of:

acquiring a measurement of:

an interval of vehicle usage time from an initial time;

a vehicle speed;

a state of charge of the battery module;

a value of power output from the electric motor;

a transmission ratio of torque generated by the electric motor to a wheel of the vehicle;

an inclination angle of the vehicle with respect to a reference direction; and a load present on board the vehicle;

calculating at least one operating parameter characterizing the use of the vehicle at the predetermined usage time based on the acquired measurements as a function of at least one value of power output from the motor;

defining a quality of use index of the vehicle as a function of said at least one operating parameter of the vehicle;

determining an optimal value of the power output value from the motor for which the quality of use index is qual equal to or greater than a threshold value; and generating a control signal to modify the power output from the electric motor and the transmission ratio from the measured value to the optimal value within said predetermined interval of time, wherein the step of calculating at least one operating parameter provides for:

calculating the at least one operating parameter as a function of the value of power output from the motor and the transmission ratio of the torque generated by the electric motor to a wheel of the vehicle, and further comprises the steps of:

determining an optimal value of the transmission ratio for which the quality of use index is equal to or greater than a threshold value; and generating a further control signal to modify the transmission ratio from the measured value to the optimal value within said predetermined interval of time.

12. A system comprising:

an electrified vehicle; and a remote processing entity, wherein the vehicle comprises an electric motor module, a battery module configured to power the electric motor module, a sensor assembly, and a local controlling entity, and wherein the local controlling entity and the remote processing entity are configured to exchange data with each other to perform a method for optimizing a use quality of the electrified vehicle, the method comprising the steps of:

acquiring a measurement of:

an interval of vehicle usage time from an initial time;

a vehicle speed;

a state of charge of the battery module;

a value of power output from the electric motor;

a transmission ratio of torque generated by the electric motor to a wheel of the vehicle;

an inclination angle of the vehicle with respect to a reference direction; and a load present on board the vehicle;

calculating at least one operating parameter characterizing the use of the vehicle at the predetermined usage time based on the acquired measurements as a function of at least one value of power output from the motor;

defining a quality of use index of the vehicle as a function of said at least one operating parameter of the vehicle;

determining an optimal value of the power output value from the motor for which the quality of use index is qual equal to or greater than a threshold value; and generating a control signal to modify the power output from the electric motor and the transmission ratio from the measured value to the optimal value within said predetermined interval of time, wherein the step of calculating at least one operating parameter provides for:

calculating the at least one operating parameter as a function of the value of power output from the motor and the transmission ratio of the torque generated by the electric motor to a wheel of the vehicle, and further comprises the steps of:

determining an optimal value of the transmission ratio for which the quality of use index is equal to or greater than a threshold value; and generating a further control signal to modify the transmission ratio from the measured value to the optimal value within said predetermined interval of time.

* * * * *